(12) United States Patent
Feng et al.

(10) Patent No.: US 8,626,325 B2
(45) Date of Patent: Jan. 7, 2014

(54) AUDIO DEVICE AND METHOD FOR APPENDING IDENTIFICATION DATA INTO AUDIO SIGNALS

(75) Inventors: Xue-Wen Feng, Shenzhen (CN); Jian-Ming Qiu, Shenzhen (CN); Dong-Jiao Guo, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 617 days.

(21) Appl. No.: 12/953,481

(22) Filed: Nov. 24, 2010

(65) Prior Publication Data

US 2012/0109346 A1    May 3, 2012

(30) Foreign Application Priority Data

Oct. 28, 2010    (CN) .......................... 2010 1 0523454

(51) Int. Cl.
*G06F 17/00*    (2006.01)
(52) U.S. Cl.
USPC .......................................................... 700/94
(58) Field of Classification Search
USPC .................... 700/94; 704/500–504, E19.009; 713/176; 386/260
See application file for complete search history.

(56) References Cited

U.S. PATENT DOCUMENTS

| 6,345,100 | B1 * | 2/2002 | Levine .......................... 380/205 |
| 6,389,055 | B1 * | 5/2002 | August et al. .................. 375/130 |
| 6,691,083 | B1 | 2/2004 | Breen |
| 2009/0322426 | A1 | 12/2009 | Nyboe et al. |
| 2010/0002891 | A1 | 1/2010 | Shiraishi et al. |
| 2010/0019775 | A1 | 1/2010 | Ikejiri |
| 2010/0034513 | A1 * | 2/2010 | Nakano et al. .................. 386/94 |
| 2011/0246202 | A1 * | 10/2011 | McMillan et al. ............. 704/270 |

\* cited by examiner

*Primary Examiner* — Andrew C Flanders
(74) *Attorney, Agent, or Firm* — Altis Law Group, Inc.

(57) ABSTRACT

An audio device includes a processor, a storage unit, an audio processing module, a silence detection circuit, a condition determining circuit, a direct current (DC) level bias circuit and an appending circuit. The audio device generates identification data, control signals, and original audio signals. The silence detection circuit detects silence segments of the original audio signals, and generates driving signals if the silence segments are detected. Then the condition determining circuit determines if the identification data needs to be appended into the silence segments according to the driving signals and the control signals, and outputs the identification data in DC signal form if the identification data needs to be appended into the silence segments. After DC voltage level of the identification data in DC signal form is biased, the appending circuit appends the biased identification data into the silence segments of the original audio signals.

8 Claims, 8 Drawing Sheets

AUDIO DEVICE AND METHOD FOR APPENDING IDENTIFICATION DATA INTO AUDIO SIGNALS

BACKGROUND

1. Technical Field

The disclosure relates to audio devices, and particularly to an audio device capable of appending identification data into audio signals.

2. Description of Related Art

With development and usage of multimedia technology and digital communication technology, multimedia works, such as, image works, audio works, and video works, need to be authenticated and protected to insure information security. When producing or generating audio works, for example, producing discs, original audio signals are output directly through a digital to analog converter. Thus, if the audio works are pirated, it is difficult to find out pirated headstream, which results in serious damage in business.

SUMMARY OF THE INVENTION

An audio device includes an audio processing module, at least one processor, a storage unit, a silence detection circuit, a condition determining circuit, a direct current (DC) level bias circuit and an appending circuit. The audio processing module generates original audio signals. The at least one processor generates identification data and control signals according to an input of a user, wherein the identification data is appended into the original audio signals according to the control signals. The storage unit stores the identification data. The silence detection circuit detects silence segments of the original audio signals, and generates driving signals if at least one of the silence segments of the original audio signals is detected. The condition determining circuit determines if the identification data needs to be appended into the silence segments according to the driving signals and the control signals, and outputs the identification data in DC signal form if the identification data needs to be appended into the silence segments of the original audio signals. The DC level bias circuit biases DC voltage level of the identification data in DC signal form. The appending circuit appends the biased identification data into the silence segments of the original audio signals Other advantages and novel features will become more apparent from the following detailed description when taken in conjunction with the accompanying drawings.

DETAILED DESCRIPTION

Figure 1:
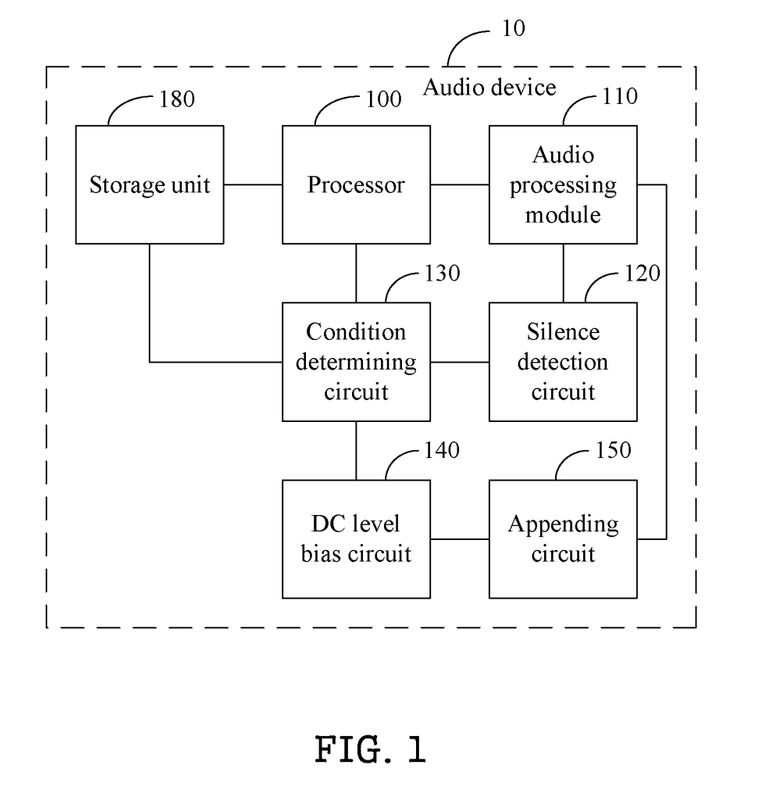
FIG. 1 is a schematic diagram of one embodiment of an audio device as disclosed.

FIG. 1 is a schematic diagram of one embodiment of an audio device 10 as disclosed. In one embodiment, the audio device 10, such as, a set top box, generates or records audio signals, and appends identification data into the audio signals to form an audio work. When the audio work appended with the identification data are pirated, the identification data can be picked to find out a pirated headstream. It should be understood that "pirated headstream" is defined to be an original audio work which is pirated from. The audio device 10 includes at least one processor 100, an audio processing module 110, a silence detection circuit 120, a condition determining circuit 130, a direct current (DC) level bias circuit 140, an appending circuit 150, and a storage unit 180.

The audio processing module 110 may comprise computerized code in the form of one or more programs that are stored in the storage unit 180 (or memory). The computerized code includes instructions that are executed by the at least one processor 100 to provide functions for the audio processing module 110.

The processor 100 generates identification data and control signals according to an input of a user. In one embodiment, the input of the user may be a selection if the audio device 10 needs to append the identification data into audio signals. The user may do the selection on a selection page by a mouse. The identification data is appended into audio signals according to the control signals. In one embodiment, the identification data includes digital right information, such as, a hardware serial number of the audio device 10, which is convenient for finding out the pirated headstream. The identification data includes a header, digital right information, and a trailer. For example, if the identification data is "101010101111010000101001010101", thus, "10101010" is the header, "1111010000101001" is the digital right information, and "01010101" is the trailer. If the user selects that the audio device 10 needs to append the identification data into the audio signals, the processor 100 generates the control signals with high level. In one embodiment, the high level may be a voltage level greater than a predetermined value, such as, 3.3V, representing digital signals "1". If the user selects that the audio device 10 needs not be append the identification data into the audio signals, the processor 100 generates the control signals with low level. In one embodiment, the low level may a voltage level nearly to be 0, representing digital signals "0". The storage unit 180 stores the identification data. The audio processing module 110 generates original audio signals. In alternative embodiment, the storage unit 180 further stores the control signals and the original audio signals.

The silence detection circuit 120 is connected to the audio processing module 110, and detects silence segments of the original audio signals and generates driving signals if at least one of the silence segments of the original audio signals is detected. In one embodiment, the silence detection circuit 120 detects the silence segments of the original audio signals according to voltage amplitude of the original audio signals. That is, the silence detection circuit 120 detects if an absolute value of the voltage amplitude of the original audio signals is less than a maximum value of the silence segments, such as, 166 mV, to determine the silence segments of the original audio signals. In one embodiment, the driving signals may be high level logic signals, representing digital signals "1". In one embodiment, the high level of the driving signals may also be a voltage level greater than the predetermined value, such as, 3.3V The condition determining circuit 130 is connected to the silence detection circuit 120, the processor 110 and the DC level bias circuit 140, and determines if the identification data needs to be appended into the silence segments of the original audio signals according to the driving signals and the control signals. The condition determining circuit 130 further outputs the identification data in DC signals form if the identification data needs to be appended into the silence segments of the original audio signals. In one embodiment, the control signals may be high/low level logic signals to control the identification data to be appended into the original audio signals. For example, when the control signals are high level logic signals, such as, logic signals with a voltage level greater than 3.3V, the identification data needs to be appended into the original audio signals. At this time, if the condition determining circuit 130 also receives the driving signals, the condition determining circuit 130 determines that the identification data needs to be appended into the detected silence segments of the original audio signals. When the control signals are low level logic signals, such as, logic signal with a voltage level nearly to be 0V, the identification data needs not to be appended into the original audio signals.

The DC level bias circuit 140 biases DC voltage level of the identification data in DC signals form received from the condition determining circuit 130. The appending circuit 150 receives the biased identification data and the original audio signals, and appends the biased identification data into the silence segments of the original audio signals.

Figure 2:
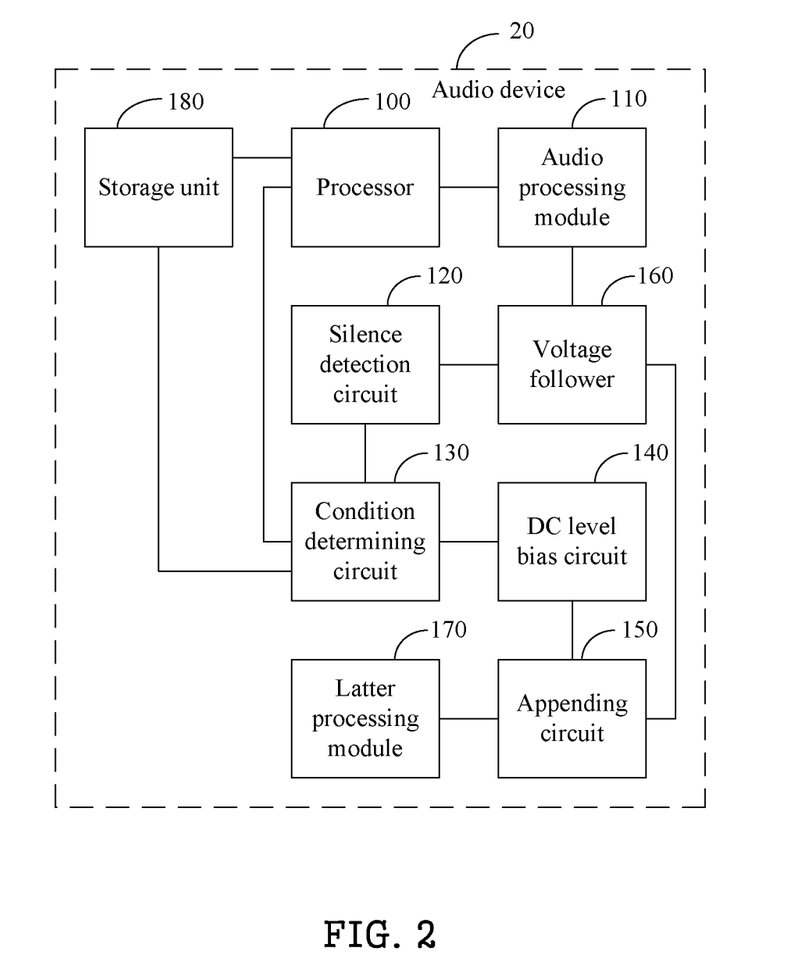
FIG. 2 is a schematic diagram of another embodiment of an audio device as disclosed.

FIG. 2 is a schematic diagram of another embodiment of an audio device 20 as disclosed. The audio device 20 is similar to the audio device 10 of FIG. 1 except that the audio device 20 further includes a voltage follower 160 and the latter processing module 170. The voltage follower 160 is connected between the audio processing module 110 and the silence detection circuit 120 and between the audio processing module 110 and the appending circuit 150. The voltage follower 160 isolates the audio processing module 110 and the silence detection circuit 120, isolates the audio processing module 110 and the appending circuit 150, and buffers the original audio signals. Thus, signals generated by the silence detection circuit 120 and the appending circuit 150 do not feedback to the audio processing module 110, which avoids influence on the original audio signals and insures quality of the original audio signals. The latter processing module 170 processes the audio signals appended with the identification data, such as, recording, and outputs the processed audio signals to other devices or display devices.

Figure 3:
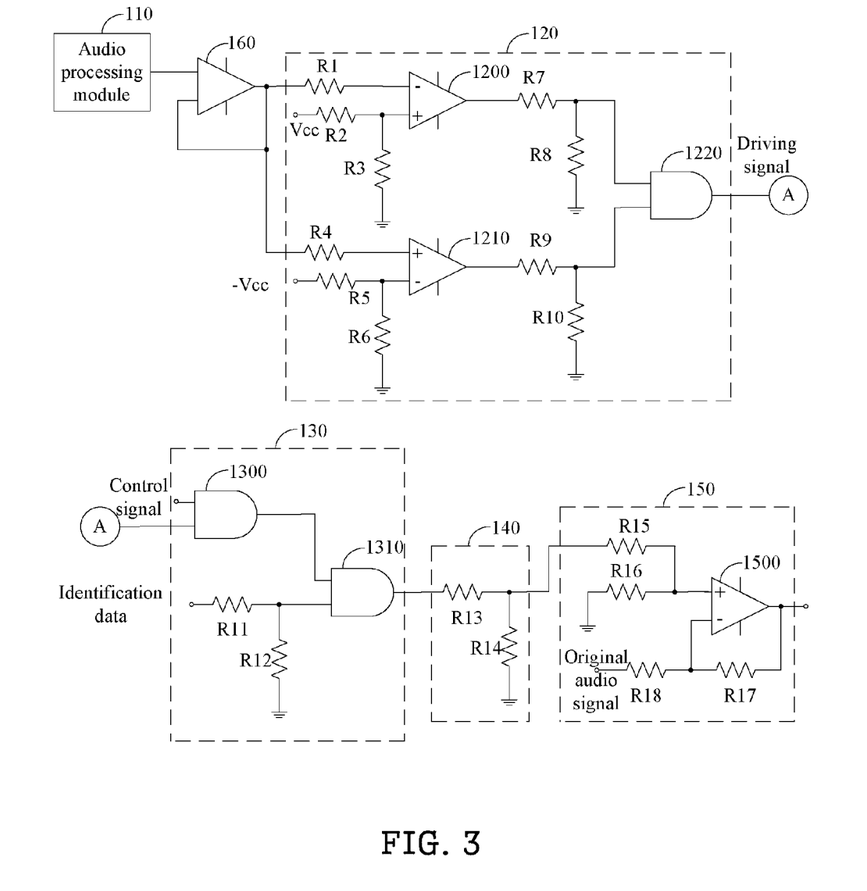
FIG. 3 is a circuit diagram of one embodiment of an audio device as disclosed.

FIG. 3 is a circuit diagram of one embodiment of the audio devices 10 and 20. In one embodiment, the silence detection circuit 120 includes a first comparator 1200, a second comparator 1210, and an AND gate 1220. The first comparator 1200 includes a first inverting input terminal, a first non-inverting input terminal, and a first output terminal The first non-inverting input terminal receives the original audio signals from the audio processing module 110 or the voltage follower 160 via a first resistor R1. The first inverting input terminal receives a first reference voltage Vcc via a second resistor R2, and is connected to the ground via a third resistor R3. In one embodiment, the first reference voltage Vcc and resistance of the second resistor R2 and the third resistor R3 are related to the maximum value of the silence segments of the original audio signals. The first reference voltage Vcc is divided by the second resistor R2 and the third resistor R3, and divided voltage on the third resistor R3 is equal to the maximum value of the silence segments of the original audio signals. For example, the maximum value of the silence segments of the original audio signals is 166 mV, the first reference voltage Vcc is 3.3V, the resistance of the second resistor R2 is 27K ohm, and the resistance of the third resistor R3 is 1K ohm.

The second comparator 1210 includes a second inverting input terminal, a second non-inverting input terminal, and a second output terminal The second inverting input terminal receives the original audio signals from the audio processing module 110 or the voltage follower 160 via a fourth resistor R4. The second non-inverting input terminal receives a second reference voltage −Vcc via a fifth resistor R5, and is connected to the ground via a sixth resistor R6. The second reference voltage −Vcc and the first reference voltage Vcc have the same values and inverted phases. In one embodiment, the second reference voltage −Vcc and resistance of the fifth resistor R5 and the sixth resistor R6 are related to the maximum value of the silence segments of the original audio signals. The second reference voltage −Vcc is divided by the fifth resistor R5 and the sixth resistor R6, and an absolute value of divided voltage on the sixth resistor R6 is equal to the maximum value of the silence segments of the original audio signals.

The AND gate 1220 includes two input terminals and an output terminal One input terminal of the AND gate 1220 is connected to the first output terminal of the first comparator 1200 via a seventh resistor R7, and is connected to the ground via an eighth resistor R8. Another input terminal of the AND gate 1220 is connected to the second output terminal of the second comparator 1210 via a ninth resistor R9, and is connected to the ground via a tenth resistor R10. The output terminal of the AND gate 1220 outputs the driving signals. The seventh resistor R7 and the eighth resistor R8 bias voltage level of output signals of the first comparator 1200 into voltage level suitable for the AND gate 1220, and the ninth resistor R9 and the tenth resistor R10 bias voltage level of output signals of the second comparator 1210 into voltage level suitable for the AND gate 1220.

The condition determining circuit 130 includes a first AND gate 1300 and a second AND gate 1310. The first AND gate 1300 and the second AND gate 1310 respectively includes two input terminals and one output terminal. One input terminal of the first AND gate 1300 receives the control signals from the processor 100 or the storage unit 180, and another input terminal of the first AND gate 1300 receives the driving signals from the silence detection circuit 120. The first AND gate 1300 determines if the identification data needs to be appended into the silence segments of the original audio signals, and outputs the determination result via the output terminal to one input terminal of the second AND gate 1310. In one embodiment, the determination result may be high or low level logic signals. Another input terminal of the second AND gate 1310 receives the identification data from the processor 100 or the storage unit 180 via an eleventh resistor R11 and connected to the ground via a twelfth resistor R12, and the output terminal of the second AND gate 1310 outputs the identification date in DC signal form.

The DC level bias circuit 140 includes a thirteenth resistor R13 and a fourteenth resistor R14. The thirteenth resistor R13 has one end receiving the identification data in DC signal form and another end outputting the biased identification data. The fourteenth resistor R14 has one end connected to the another end of the thirteenth resistor R13 and another end connected to the ground.

The appending circuit 150 includes a difference amplifier 1500, and the difference amplifier 1500 includes an inverting input terminal, a non-inverting input terminal, and an output terminal. The inverting input terminal of the difference amplifier 1500 receives the biased identification data from the DC level bias circuit 140 via a fifteenth resistor R15, and is connected to the ground via a sixteenth resistor R16. The non-inverting input terminal of the difference amplifier 1500 is connected to the output terminal of the difference amplifier 1500 via a seventeenth resistor R17, and receives the original audio signals from the audio processing module 110 or the voltage follower 160 via an eighteenth resistor R18. The output terminal of the difference amplifier 1500 outputs the audio signals appended with the identification data. In one embodiment, the difference amplifier 1500 has good noise suppressing performance, which can reduce noise and insure quality of the audio signals appended with the identification data.

In one embodiment, the original audio signals are input to the silence detection circuit 120 after generated by the audio processing module 110. If the voltage amplitude of some segments of the original audio signals is greater than the maximum value of the silence segments, that is, these segments of the original audio signals are not the silence segments, voltage on the non-inverting input terminal of first comparator 1200 is greater than the voltage on the inverting input terminal of the first comparator 1200, the first comparator 1200 outputs low level logic signals. Voltage on the inverting input terminal of the second comparator 1210 is greater than the voltage on the non-inverting input terminal of the second comparator 1210, so the second comparator 1210 outputs high level logic signals. Thus, the AND gate 1220 outputs low level logic signals, and does not output driving signals.

If the voltage amplitude of some segments of the original audio signals is negative and absolute value of the voltage amplitude of these segments of the original audio signals is greater than the maximum value of the silence segments, that is, these segments of the original audio signals are not the silence segments, voltage on the non-inverting input terminal of first comparator 1200 is less than the voltage on the inverting input terminal of the first comparator 1200, the first comparator 1200 outputs high level logic signals. Voltage on the inverting input terminal of the second comparator 1210 is less than the voltage on the non-inverting input terminal of the second comparator 1210, so the second comparator 1210 outputs low level logic signals. Thus, the AND gate 1220 outputs low level logic signals, and does not output driving signals.

If the AND gate 1220 outputs low level logic signals, no matter what are the control signals, the first AND gate 1300 of the condition determining circuit 130 outputs low level logic signals. Thus, the identification data needs not be appended into these segments of the original audio signals.

If the voltage amplitude of some segments of the original audio signals is negative and absolute value of the voltage amplitude of these segments of the original audio signals is less than the maximum value of the silence segments or the voltage amplitude of some segments of the original audio signals is less than the maximum value of the silence segments, that is, these segments of the original audio signals are the silence segments, voltage on the non-inverting input terminal of first comparator 1200 is less than the voltage on the inverting input terminal of the first comparator 1200, the first comparator 1200 outputs high level logic signals. Voltage on the inverting input terminal of the second comparator 1210 is greater than the voltage on the non-inverting input terminal of the second comparator 1210, so the second comparator 1210 outputs high level logic signals. Thus, the AND gate 1220 outputs high level logic signals, that is, the driving signals.

When the silence detection circuit 120 outputs the driving signals and if the control signals represent that the identification data needs to be appended into the original audio signals, the first AND gate 1300 of the condition determining circuit 130 outputs high level logic signals, that is, a determination result that the identification data needs to be appended into the original audio signals. Thus, the second AND gate 1310 outputs the input identification data in DC signal form. Because DC voltage level of the identification data in DC signal form is different from that of the difference amplifier 1500 of the appending circuit 150, the thirteenth resistor R13 and the fourteenth resistor R14 bias the DC voltage level. In one embodiment, resistance of the thirteenth resistor R13 is 20K ohm, and resistance of the fourteenth resistor R14 is 1 k ohm.

Figure 4:
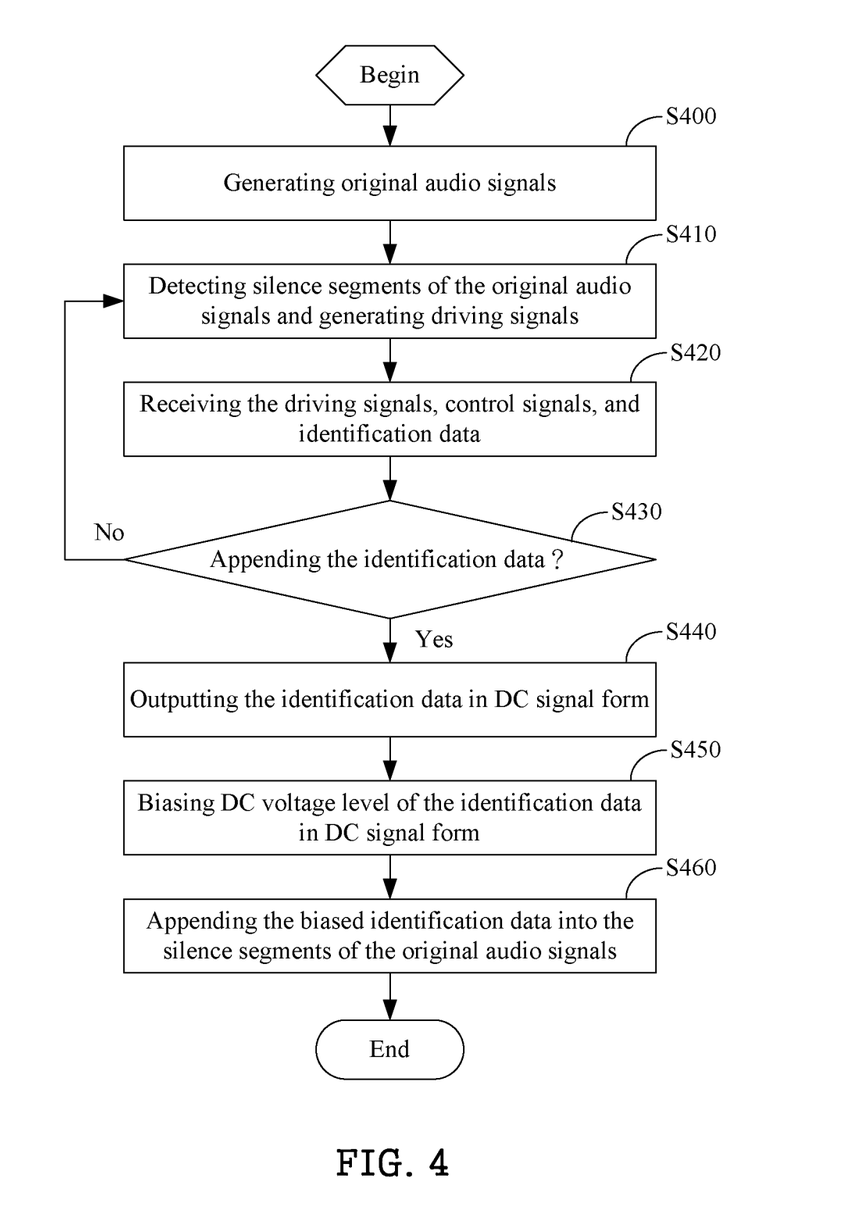
FIG. 4 is a flowchart of one embodiment of a method for appending identification data into audio signals as disclosed.

FIG. 4 is a flowchart of one embodiment of a method for appending identification data into audio signals as disclosed. In step S400, the audio processing module 110 generates original audio signals. In one embodiment, the voltage follower 160 first buffers the original audio signals to avoid signals generated by the silence detection circuit 120 and the appending circuit 150 influence the original audio signals. In step S410, the silence detection circuit 120 detects silence segments of the original audio signals, and generates driving signals if at least one of the silence segments of the original audio signals are detected. In one embodiment, the silence detection circuit 120 detects the silence segments according to voltage amplitude of the original audio signals. That is, the silence detection circuit 120 utilizes the first comparator 1200, the second comparator 1210, and the AND gate 1220 to detect if the voltage amplitude of the original audio signals is smaller the maximum value of the silence segments, such as 166 mv, to detect the silence segments of the original audio signals.

In step S420, the condition determining circuit 130 receives the driving signals from the silence detection circuit 120, and receives the control signals and the identification data from the processor 100 or the storage unit 180. In step S430, the condition determining circuit 130 determines if the identification data needs to be appended into the silence segments of the original audio signals according to the control signals and the driving signals. In one embodiment, the control signals may be high/low level logic signals to control if the identification data needs to be appended into the original audio signals. For example, when the control signals are high level logic signals, the identification data needs to be appended into the original audio signals. When the control signals are low level logic signals, the identification data needs not to be appended into the original audio signals. If the condition determining circuit 130 determines that the identification data needs not be appended into the silence segments of the original audio signals, the process returns to step S410.

If the condition determining circuit 130 determines that the identification data needs to be appended into the silence segments of the original audio signals, in step S440, the condition determining circuit 130 outputs the identification data in DC signal form. In one embodiment, steps S430 and S440 include that the silence detection circuit 120 and the processor 100 respectively input the driving signals and the control signals to two input terminals of the first AND gate 1300 of the condition determining circuit 130, to determine if the identification data needs to be appended into the silence segments of the original audio signals. If the identification data needs to be appended into the silence segments of the original audio signals, the first AND gate 1300 output the determination result to one input terminal of the second AND gate 1310, the processor 100 inputs the identification data to another input terminal of the second AND gate 1310, and the second AND gate 1310 outputs the identification data in DC signal form from the output terminal of the second AND gate 1310.

In step S450, the DC level bias circuit 140 biases the DC voltage level of the identification data in DC signal form. Because the DC voltage level of the identification data in DC signal form is different from that of the difference amplifier 1500 of the appending circuit 150, the thirteenth resistor R13 and the fourteenth resistor R14 bias the DC voltage level.

In step S460, the appending circuit 150 appends the biased identification data into the silence segments of the original audio signals. In one embodiment, the DC level bias circuit 140 output the biased identification data to the inverting input terminal of the difference amplifier 1500, the audio processing module 110 or the voltage follower 160 outputs the original audio signals to the non-inverting input terminal of the difference amplifier 1500, and the difference amplifier 1500 appends the biased identification data into the silence segments of the original audio signals.

Figure 5:
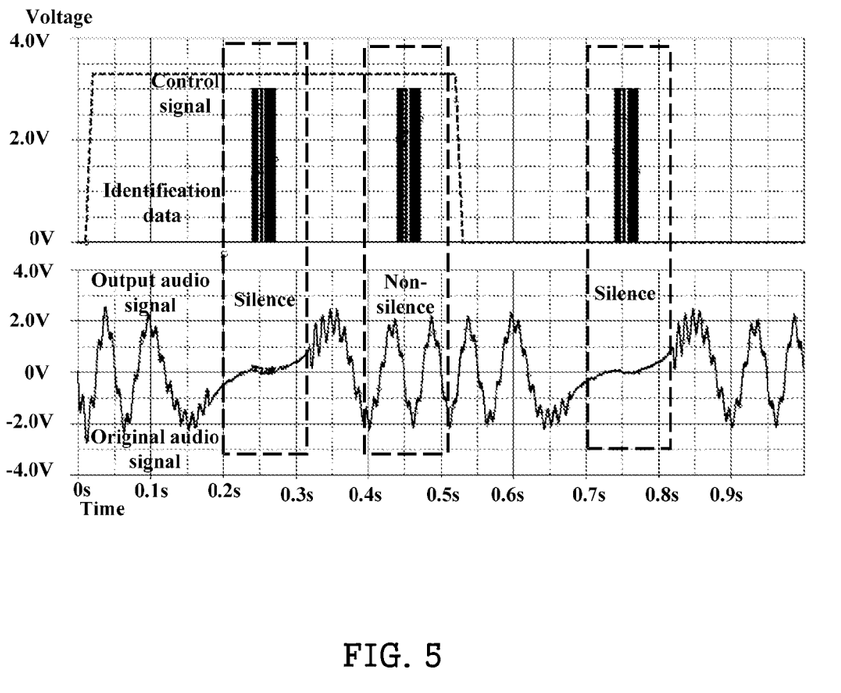
FIGS. 5 to 8 are schematic diagrams of simulation signal effect of an audio device.
Figure 6:
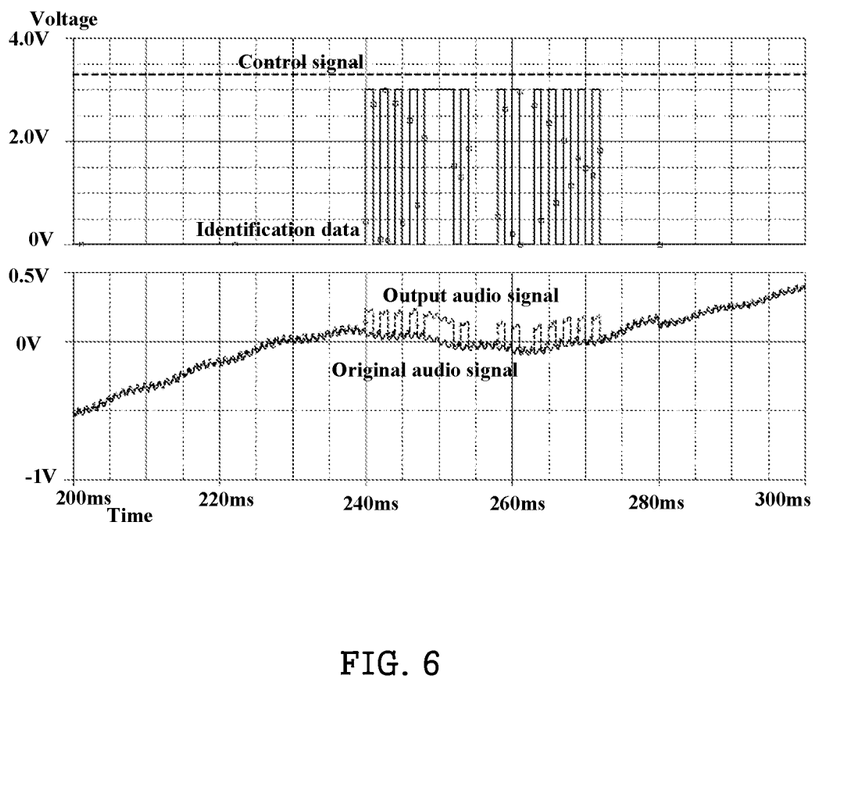
Figure 7:
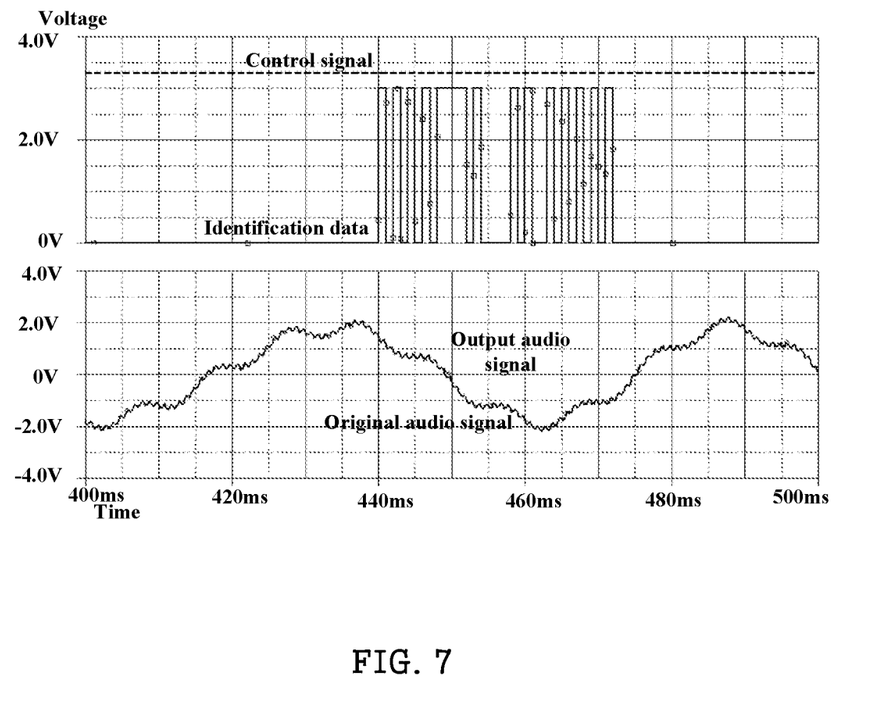
Figure 8:
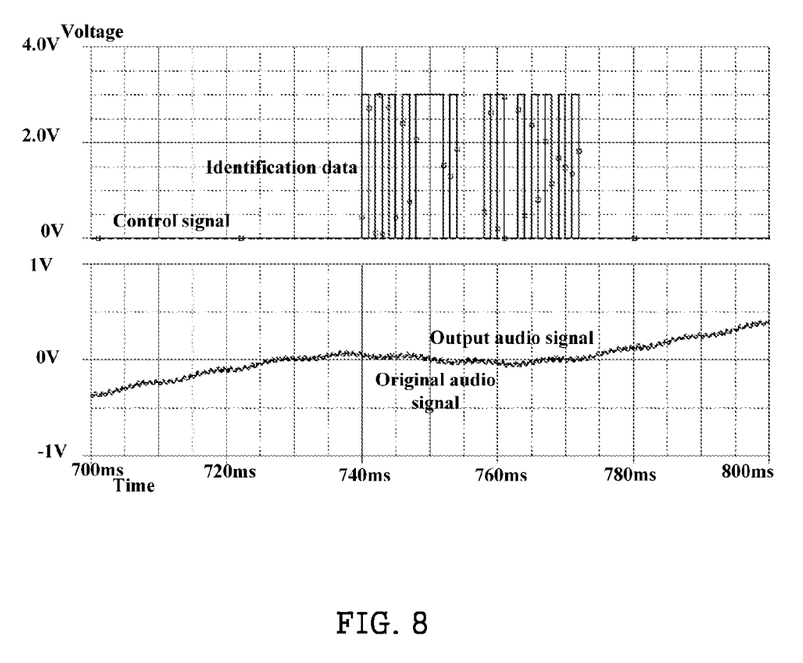

FIGS. 5 to 8 are schematic diagrams of simulation signal effect of the audio devices 10 and 20. FIG. 5 shows the control signals, the identification data, the original audio signals, and output audio signal (that is, the audio signals appended with the identification data) at a long time, and FIGS. 6 to 8 are respectively one part of FIG. 5. The control signals are high level logic signals and the original audio signals are in silence segments in FIG. 6. The control signals are high level logic signals and the original audio signals are in non-silence segments in FIG. 7. The control signals are low level logic signals and the original audio signals are in silence segments is FIG. 8. As show in FIGS. 5 to 8, the output audio signals appended with the identification data at the silence segments and the original audio signals are nearly superposed. That is, the audio devices 10 and 20 appending the identification data into the silence segments of the original audio signals have less influence on the original audio signals, which insures quality of the output audio signals appended with the identification data.

The audio devices 10 and 20 and the method for appending identification data into audio signals appends the identification data into the original audio signals. Thus, when the audio signals appended with the identification data are pirated, the identification data can be picked to find out pirated headstream, which insures safety and protection of the audio signals.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. An audio device, comprising:
    an audio processing module, to generate original audio signals;
    at least one processor, to generate identification data and control signals according to an input of a user, wherein the identification data is appended into the original audio signals according to the control signals;
    a storage unit, to store the identification data;
    a silence detection circuit, to detect silence segments of the original audio signals, and to generate driving signals if at least one of the silence segments of the original audio signals is detected;
    a condition determining circuit, to determine if the identification data needs to be appended into the silence segments of the original audio signals according to the driving signals and the control signals, and to output the identification data in direct current (DC) signal form if the identification data needs to be appended into the silence segments of the original audio signals;
    a DC level bias circuit, to bias DC voltage level of the identification data in DC signal form;
    an appending circuit, to append the biased identification data into the silence segments of the original audio signals; and
    a voltage follower connected between the audio processing module and the silence detection circuit and between the audio processing module and the appending circuit, to isolate the audio processing module and the silence detection circuit, isolate the audio processing module and the appending circuit, and buffer the original audio signals.

2. The audio device of claim 1, wherein the identification data comprises digital right information.

3. The audio device of claim 1, wherein the silence detection circuit comprises:
    a first comparator, comprising a first inverting input terminal, a first non-inverting input terminal, and a first output terminal, the first non-inverting input terminal receiving the original audio signals via a first resistor, the first inverting input terminal receiving a first reference voltage via a second resistor and connected to the ground via a third resistor;
    a second comparator, comprising a second inverting input terminal, a second non-inverting input terminal, and a second output terminal, the second inverting input terminal receiving the original audio signals via a fourth resistor, the second non-inverting input terminal receiving a second reference voltage via a fifth resistor and connected to the ground via a sixth resistor, wherein the second reference voltage and the first reference voltage have same voltage value and inverted phases; and
    an AND gate, comprising two input terminals and an output terminal, one input terminal of the AND gate connected to the first output terminal of the first comparator via a seventh resistor and connected to the ground via an eighth resistor, another input terminal of the AND gate connected to the second output terminal of the second comparator via a ninth resistor and connected to the ground via a tenth resistor, and the output terminal of the AND gate outputting the driving signals.

4. The audio device of claim 1, wherein the condition determining circuit comprises:
    a first AND gate, to determine if the identification data needs to be appended into the silence segments of the original audio signals according to the driving signals and the control signals, comprising two input terminals and an output terminal, one input terminal of the first AND gate receiving the control signals, and another input terminal of the first AND gate receiving the driving signals from the silence detection circuit; and
    a second AND gate, comprising two input terminals and an output terminals, one input terminal of the second AND gate connected to the output terminal of the first AND gate, another input terminal of the second AND gate receiving the identification data via an first resistor and connected to the ground via a second resistor, and the output terminal of the second AND gate outputting the identification data in DC signal form.

5. The audio device of claim 1, wherein the DC level bias circuit comprises:
    a first resistor with one end receiving the identification data in DC signal form and another end outputting the biased identification data; and
    a second resistor with one end connected to the another end of the first resistor and another end grounded.

6. The audio device of claim 1, wherein the appending circuit comprises a difference amplifier comprising an inverting input terminal, a non-inverting input terminal, and an output terminal, the inverting input terminal of the difference amplifier receiving the biased identification data via a first resistor and connected to the ground via a second resistor, the non-inverting input terminal of the difference amplifier connected to the output terminal of the difference amplifier via a third resistor and receiving the original audio signals via an fourth resistor, and the output terminal of the difference amplifier outputting audio signals appended with the identification data.

7. A method for appending identification data into audio signals, comprising:
  generating original audio signals;
  detecting silence segments of the original audio signals, and generating driving signals if at least one of the silence segments of the original audio signals is detected;
  receiving control signals and identification data;
  respectively inputting the driving signals and the control signals to two input terminals of a first AND gate, to determine if the identification data needs to be appended into the silence segments of the original audio signals;
  outputting a determination result from an output terminal of the first AND gate to one input terminal of a second AND gate, inputting the identification data to another input terminal of the second AND gate, and outputting the identification data in DC signal form from an output terminal of the second AND gate if the identification data needs to be appended into the silence segments of the original audio signals;
  biasing DC voltage level of the identification data in DC signal form; and
  appending the biased identification data into the silence segments of the original audio signals.

8. The method for appending identification data into audio signals of claim 7, further comprising: buffering the original audio signals.

* * * * *